(12) United States Patent
Embrechts et al.

(10) Patent No.: US 11,704,400 B2
(45) Date of Patent: Jul. 18, 2023

(54) AUTHENTICATION METHOD, WEARABLE DEVICE AND MOBILE DEVICE

(71) Applicant: Sony Corporation, Tokyo (JP)

(72) Inventors: Hugo Embrechts, Stuttgart (DE); Dimitri Torfs, Stuttgart (DE); Conor Aylward, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 920 days.

(21) Appl. No.: 16/324,139

(22) PCT Filed: Aug. 10, 2017

(86) PCT No.: PCT/EP2017/070390
§ 371 (c)(1),
(2) Date: Feb. 8, 2019

(87) PCT Pub. No.: WO2018/029324
PCT Pub. Date: Feb. 15, 2018

(65) Prior Publication Data
US 2019/0171806 A1    Jun. 6, 2019

(30) Foreign Application Priority Data

Aug. 11, 2016    (EP) ..................... 16183880

(51) Int. Cl.
*G06F 21/35*    (2013.01)
*H04W 4/029*    (2018.01)
(Continued)

(52) U.S. Cl.
CPC ......... *G06F 21/35* (2013.01); *G01C 21/1654* (2020.08); *G06K 19/07762* (2013.01);
(Continued)

(58) Field of Classification Search
CPC ............. G06F 21/35; G06F 2221/2111; G06K 19/07762; H04W 4/025; H04W 4/029;
(Continued)

(56) References Cited

U.S. PATENT DOCUMENTS 8,683,707 B1 *   4/2014   Horton, Jr. ............. G01C 17/00
                                                            33/355 R
D732,994 S       6/2015   Wentz et al.
(Continued)

FOREIGN PATENT DOCUMENTS

WO    2014/143814 A1    9/2014
WO    2014/143997 A1    9/2014
(Continued)

OTHER PUBLICATIONS

Natasha Lomas, "Everykey Wants to Put Your Passwords on Your Wrist", Nov. 8, 2014, pp. 1-6.
(Continued)

*Primary Examiner* — Meng Li
(74) *Attorney, Agent, or Firm* — Xsensus LLP

(57) ABSTRACT

In an authentication method, a wireless communication is established between a mobile device and a wearable device. A proximity is detected between the mobile device and the wearable device by comparing mobile device position information and wearable device position information. Access to the mobile device is granted based on a detected proximity.

18 Claims, 4 Drawing Sheets

(51) Int. Cl.

| | | |
|---|---|---|
| *H04W 12/06* | (2021.01) | |
| *H04W 12/082* | (2021.01) | |
| *H04W 12/33* | (2021.01) | |
| *G01C 21/16* | (2006.01) | |
| *G06K 19/077* | (2006.01) | |
| *H04W 4/02* | (2018.01) | |
| *H04W 4/80* | (2018.01) | |
| *H04W 12/04* | (2021.01) | |
| *H04W 12/63* | (2021.01) | |

(52) U.S. Cl.
CPC ............ *H04W 4/025* (2013.01); *H04W 4/029* (2018.02); *H04W 12/068* (2021.01); *H04W 12/082* (2021.01); *H04W 12/33* (2021.01); *G06F 2221/2111* (2013.01); *H04W 4/80* (2018.02); *H04W 12/04* (2013.01); *H04W 12/63* (2021.01)

(58) Field of Classification Search
CPC . H04W 12/068; H04W 12/082; H04W 12/33; H04W 4/80; H04W 12/04; H04W 12/63; G01C 21/165
See application file for complete search history.

(56) References Cited

U.S. PATENT DOCUMENTS

| | | | | |
|---|---|---|---|---|
| 9,225,516 | B1* | 12/2015 | O'Connor | H04L 9/3234 |
| 9,661,470 | B1* | 5/2017 | Du Bois | G01S 17/86 |
| 9,675,875 | B2* | 6/2017 | Dugan | A61B 5/0002 |
| 2009/0016559 | A1* | 1/2009 | Cleary | H04R 1/1091 |
| | | | | 381/378 |
| 2012/0300932 | A1* | 11/2012 | Cambridge | H04W 12/02 |
| | | | | 380/270 |
| 2015/0058942 | A1* | 2/2015 | Dermu | H04W 12/35 |
| | | | | 726/6 |
| 2015/0161377 | A1 | 6/2015 | Rodzevski et al. | |
| 2015/0170504 | A1* | 6/2015 | Jooste | A61B 5/6802 |
| | | | | 340/539.12 |
| 2015/0215292 | A1* | 7/2015 | Novicov | H04W 4/80 |
| | | | | 713/168 |
| 2015/0215293 | A1* | 7/2015 | Ellison | G06F 21/72 |
| | | | | 713/171 |
| 2016/0037346 | A1* | 2/2016 | Boettcher | H04W 12/04 |
| | | | | 455/411 |
| 2016/0080154 | A1* | 3/2016 | Lee | H04L 9/3234 |
| | | | | 713/185 |
| 2016/0255459 | A1* | 9/2016 | Sarkar | H04W 12/04 |
| | | | | 455/41.1 |
| 2016/0269376 | A1* | 9/2016 | Goyal | H04L 63/04 |
| 2017/0116651 | A1* | 4/2017 | Greenberger | H04W 4/022 |
| 2017/0150305 | A1* | 5/2017 | Chaudhri | H04M 1/72412 |
| 2017/0235369 | A1* | 8/2017 | Acer | G06F 3/017 |
| | | | | 345/173 |
| 2017/0318612 | A1* | 11/2017 | Gu | H04W 52/0206 |
| 2018/0239932 | A1* | 8/2018 | Gummeson | H04W 12/08 |
| 2019/0171806 | A1* | 6/2019 | Embrechts | G01C 21/1654 |

FOREIGN PATENT DOCUMENTS

| | | |
|---|---|---|
| WO | 2015/026775 A1 | 2/2015 |
| WO | 2015/065494 A1 | 5/2015 |
| WO | 2015/112493 A1 | 7/2015 |

OTHER PUBLICATIONS

Markus Jakobsson, "How to Wear Your Password", Qualcomm Technologies, Inc., 2014, 13 pages.
Yang et al., "Mobility Increases Localizability: A survey on Wireless Indoor Localization using Inertial Sensors", ACM Computing Surveys, vol. 47 No. 43, Article 54, Apr. 1, 2015, p. 54:1-54:34.
Halevi et al., "Secure Proximity Detection for NFC Devices based on Ambient Sensor Data", Sep. 2012, pp. 1-18.
Shrestha et al., "Drone to the Rescue: Relay-Resilient Authentication using Ambient Multi-Sensing", Nov. 9, 2014, 16 pages.
Android Explorations, "Dissecting Lollipop's Smart Lock", Dec. 25, 2014, pp. 1-18.
International Search Report dated Oct. 30, 2017 for PCT/EP2017/070390 filed on Aug. 10, 2017, 10 pages.
Nordic Semiconductor, Available at https://web.archive.org/web/*/http://www.nordicsemi.com/eng/News/News-releases/Product-Related-News/Nordic-nRF8002-powered-Bluetooth-low-energy-proximity-key-fob-is-first-in-world-to-be-compatible-with-both-Apple-and-Samsung-smartphones, Sep. 20, 2012, 3pp.
Temptraq, "More than just a thermometer", https://www.temptraq.com/, Jan. 14, 2016, 13pp.
Everykey, "No more Keys. No more Passwords", https://everykey.com/product-information-and-specs.html, May 31, 2015, 12pp.

* cited by examiner

AUTHENTICATION METHOD, WEARABLE DEVICE AND MOBILE DEVICE

CROSS-REFERENCE TO RELATED APPLICATIONS

The present application is based on PCT filing PCT/EP2017/070390, filed Aug. 10, 2017, and claims priority to 16183880.0, filed in the European Patent Office on Aug. 11, 2016, the entire contents of each of which are being incorporated herein by reference.

TECHNICAL FIELD

The present disclosure generally pertains to an authentication method, a wearable device and a mobile device.

TECHNICAL BACKGROUND

Mobile devices typically contain security-sensitive information. It is known to secure such mobile devices by providing a lock/unlock mechanism. For unlocking the mobile device, i.e. authenticating a user, the user can input a password, pin code or the like, or a biometric signature can be detected, e.g. a fingerprint, iris of the eye or the like.

Moreover, typically the mobile device is automatically locked after a predetermined time interval. Hence, for locking/unlocking the mobile device, the user has to authenticate himself by inputting a password, pin code or the like or by scanning a biometric signature after the mobile device has been automatically locked.

However, this may not be user friendly and it may decrease security since, for example, a password may be spied out.

Although there exist techniques for locking and unlocking a mobile device, it is generally desirable to improve the unlocking of a mobile device.

SUMMARY

According to a first aspect, the disclosure provides an authentication method, comprising establishing a wireless communication between a mobile device and a wearable device, detecting a proximity between the mobile device and the wearable device by comparing mobile device position information and wearable device position information, and granting access to the mobile device based on a detected proximity.

According to a second aspect, the disclosure provides a wearable device for granting access to a mobile device comprising circuitry configured to establish a wireless communication with the mobile device, and send authentication data to the mobile device in response to a detected proximity between the mobile device and the wearable device, wherein the proximity is detected based on a comparison of mobile device position information and wearable device position information.

According to a third aspect, the disclosure provides a mobile device comprising circuitry configured to establish a wireless communication with a wearable device, receive authentication data to the mobile device in response to a detected proximity between the mobile device and the wearable device, wherein the proximity is detected based on a comparing mobile device position information and wearable device position information, and grant access to the mobile device based on a detected proximity.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
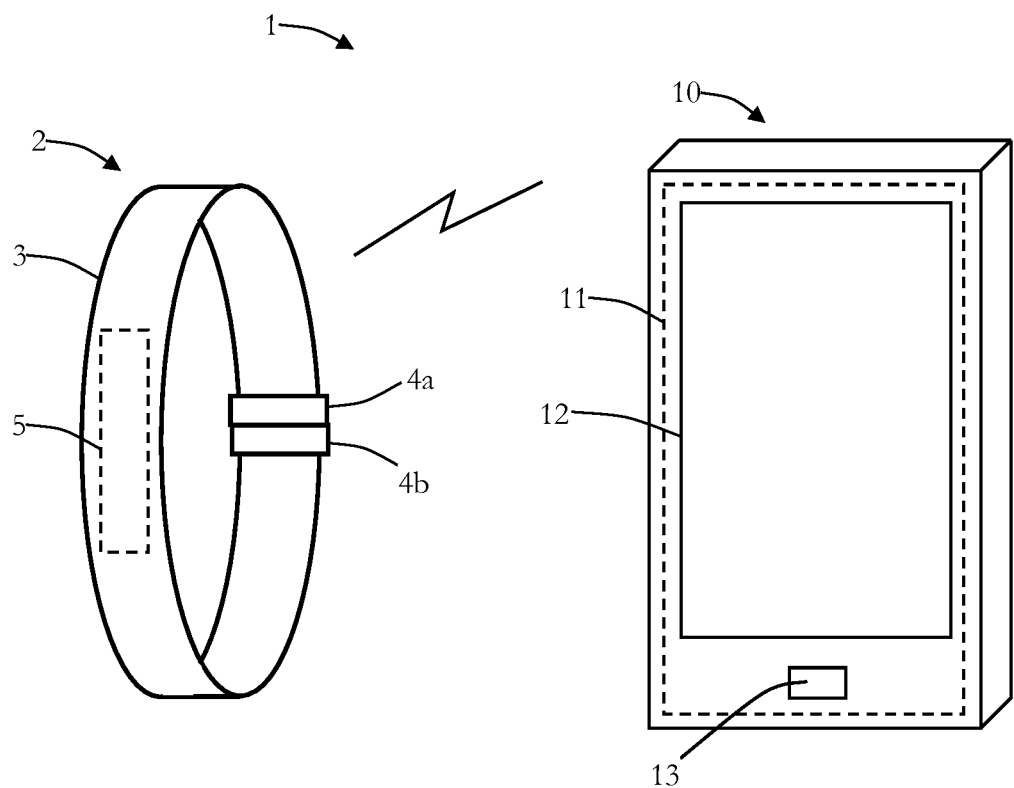
FIG. 1 illustrates a system with a wearable device and a mobile device in accordance with the present disclosure.

Before describing the embodiments under reference of FIG. 1 in detail, general explanations are made.

As also mentioned in the outset, mobile devices, such as smartphones, mobile phones, tablet computers, or the like may contain security-sensitive information, such as saved website cookies, passwords, application passwords, social site login details, etc. As discussed, typically, a mobile device is carried around and may therefore be exposed to possible threats.

Proper protection of this information stored in mobile devices may require, if no biometric authentication or hardware secure modules are used, a (strong) password which is used for booting or unlocking the mobile device.

As mentioned, having to input a password, pin code or the like for unlocking the mobile device each time the user wants to access the mobile device, can be laborious and bears the risk that a password may be spied out.

Thus, some embodiments pertain to an authentication method. The method includes establishing a wireless communication between a mobile device and a wearable device, detecting a proximity between the mobile device and the wearable device by comparing mobile device position information and wearable device position information, and granting access to the mobile device based on a detected proximity.

As mentioned, the mobile device may be a smartphone, mobile station, tablet computer, digital camera, intelligent glass, intelligent clock or any other electronic device which is mobile.

The wearable device may be a wristband, neckband, electronic patch, or any other electronic device which is wearable. In some embodiments, the wearable device is an (e.g. non-biometric) crypto wearable having a 'form-factor' providing a wristband.

The disclosed method may be executed by the mobile device and/or the wearable device described herein.

The wireless communication between the mobile device and the wearable device may be provided via Bluetooth (e.g. also BLE=Bluetooth Low Energy), WiFi, Near Field Communication (NFC) or the like. The establishment of the wireless communication between the mobile device and the wearable device may include the pairing of the mobile device and the wearable device. By pairing or a similar mechanism, typically, a secured communication channel is established between the mobile device and the wearable device. The secured communication channel may include an encrypted data communication between the mobile device and the wearable device.

As will also be further discussed below, the aim of the comparison of mobile device position information and wearable device position information is in some embodiments to determine whether the mobile device and the wearable device have the same or very similar movement pattern and/or the same or similar position. The comparison may include comparing current position information and/or historic position information.

The mobile device position information and/or the wearable device position information may directly and/or absolutely indicate the position of the mobile device and the wearable device, respectively, or it may indirectly indicate the position of the mobile device and the wearable device, respectively.

A direct and absolute indication of a position may include a direct position and absolute coordinates, such as GPS coordinates or the like, while an indirect and non-absolute indication of a position may include a relative position, which may indicate a position change with respect to a certain start position and/or start time, such that also movement patterns or the like are also considered as position information. Moreover, the position information may be in the form of digital data, digital or analog sensor signals, map-position data, etc.

Hence, in some embodiments, by comparing the mobile device position information and the wearable device position information it can be determined whether the mobile device and the wearable device are close to each other or not, whereby a proximity between the mobile device and the wearable device can be detected.

The mobile device position information and the wearable device position information may be obtained independent from each other. Hence, in some embodiments, the mobile device determines its mobile device position information independent from the wearable device, which, in turn, determines its wearable device position information independent from the mobile device.

The mobile device and/or the wearable device may include respective means, e.g. sensors, which provide signals or data which are indicative of the position and/or position change of the mobile device and the wearable device, respectively. Such sensors may be, for example, position sensors providing an absolute position information, acceleration sensors providing acceleration information, gyroscopic sensors providing angle information, magnetometers providing magnetometer information etc. The mobile device and/or the wearable device may also obtain the mobile device/wearable device position information from a source, which provides such information. For example, an indoor position system may determine the position of the mobile device/wearable device based on a wireless communication with the respective mobile device and/or wearable device, as it is generally known, and may provide the respective information to the mobile device and/or wearable device.

Granting access to the mobile device based on a detected proximity may include that a user can switch it on, unlock it, may get access to a specific service running on the mobile device, etc.

In some embodiments at least one of the mobile device position information and the wearable device position information is based on an inertial navigation system calculation. An inertial navigation system is generally known to the skilled person, and it may include summing up, for example, acceleration sensor signals and/or gyroscopic sensor signals and/or magnetometer signals such that the deviation from a start position can be determined, whereby a current position can be determined which may be indicated by the mobile device position information and the wearable device position information, respectively.

As already mentioned above, in some embodiments, at least one of the mobile device position information and the wearable device position information is based on at least one of acceleration information, gyroscope information and magnetometer information.

In some embodiments, comparing the mobile device position information and the wearable device position information includes determining a deviation between the mobile device position information and the wearable device position information. The deviation may indicate whether the mobile device and the wearable device are close to each other. The deviation may also indicate whether a distance between the mobile device and the wearable device increases or decreases, such that, for example, in the case of increasing distance no proximity is detected and access is not granted, while in the case of decreasing distance proximity is detected and access is granted.

In some embodiments, a predetermined threshold is provided and proximity is not detected in case that the deviation exceeds the predetermined threshold. The predetermined threshold may be defined based on a typical distance between the wearable device and the mobile device which can occur when a user has the wearable device at his wrist and the mobile device in a hand. Of course, other thresholds can be defined as is apparent to the skilled person. By providing a threshold, granting access can be avoided in cases where the mobile device is too far away from a user, e.g. some meters, such that the user may not recognize that an unauthorized person tries to get access to the mobile device.

In some embodiments, authentication data are determined. The authentication data may be provided by the mobile device or by the wearable device. The authentication data may be generated by the mobile device and/or by the wearable device. The authentication data may be provided or generated upon establishing the wireless communication or within a pairing procedure between the mobile device and the wearable device. The authentication data may include a session key, a symmetrical key which is used for encryption and decryption, or the like. The mobile device and the wearable device may agree on the authentication data such that both devices know the authentication data and are able to authenticate each other by providing the (correct) authentication data.

In some embodiments, granting access to the mobile device is further based on the authentication data. Hence, in some embodiments, the mobile device grants access only when the mobile device receives the correct authentication data.

In some embodiments, the authentication data are used for encrypting a mobile device (private) key and the mobile device uses the (private) key for encrypting specific data located on the mobile device, such as passwords, pin codes, cookies or the like or any other data stored in a storage of the mobile device. Of course, the mobile device can use multiple (private) keys, wherein each of the multiple keys can be encrypted with the authentication data. Thereby, in some embodiments, decryption of data stored in the storage of the mobile device is only possible, if the mobile device receives the authentication data from the wearable device and decrypts the (private) key(s) with which the data is encrypted.

As mentioned, in some embodiments, establishing the wireless communication between the mobile device and the wearable device comprises pairing the mobile device and the wearable device. Thereby, a secured wireless communication channel may be established between the mobile device and the wearable device. Setting up a secure communication channel may involve a secure protocol and, for example, an exchange of a key or the like, as it is generally known to the skilled person.

In some embodiments, it is detected whether wearing of the wearable device by a user has been interrupted. The wearable device may include a clasp, buckle, fastener or the like which is equipped with a means for detecting whether the clasp, buckle, fastener or the like is opened. The means can included a switch, an electronic or magnetic contact or the like which detects opening/closing of the clasp, buckle, fastener or the like. The wearable device may have a band, strap, bracelet or the like which also may include a means to detect opening/closing/wearing of the wearable device. In some embodiments, the interruption of the wearing can be detected with a proximity sensor which detects whether the wearable is in the proximity or not.

The wireless communication between the mobile device and the wearable device is restricted in response to detecting that the wearing of the wearable device has been interrupted. The restriction may be implemented by terminating the communication, by restricting data communication, e.g. by not sending the authentication data, etc. By restricting the communication between the mobile device and the wearable device, access to the mobile device can be denied.

In some embodiments, authentication data stored in a storage of the wearable device are deleted in response to detecting that the wearing of the wearable device has been interrupted.

Thereby, it can be avoided that an unauthorized person who has the wearable device and the mobile device gets access to the mobile device, since as soon as the wearable device has been opened or put off, interruption of the wearing is detected and the communication with the mobile device is restricted such that access is not granted. Moreover, by deleting the authentication data it is not possible to get the authentication data from the wearable device and, for example, to decrypt the (private) key(s) of the mobile device with which data in the mobile device are encrypted.

Some embodiments pertain to a wearable device, as also discussed, above, for granting access to a mobile device. The wearable device includes circuitry configured to establish a wireless communication with the mobile device and to send authentication data to the mobile device in response to a detected proximity between the mobile device and the wearable device, wherein the proximity is detected based on comparing mobile device position information and wearable device position information.

The circuitry may include a processor, a memory (RAM, ROM or the like), a storage, input means, output means, a wireless interface, etc., as it is generally known for electronic devices and electronic wearable devices.

The circuitry may be configured to execute the method as described herein, and as also described above.

The circuitry may be further configured to generate the wearable device position information based on an inertial navigation system calculation, as it has already been discussed above.

The circuitry may be further configured to detect whether wearing of the wearable device by a user has been interrupted, as discussed above.

The circuitry may be further configured to store the authentication data and to delete the authentication data in response to detecting that the wearing of the wearable device has been interrupted, as discussed above.

Some embodiments pertain to a mobile device, for example as discussed above, having circuitry configured to establish a wireless communication with a wearable device, receive authentication data to the mobile device in response to a detected proximity between the mobile device and the wearable device, wherein the proximity is detected based on a comparing mobile device position information and wearable device position information, and to grant access to the mobile device based on a detected proximity, as discussed above. The circuitry may include a processor, a memory (RAM, ROM or the like), a storage, input means, output means, a wireless interface, etc., as it is generally known for electronic devices and mobile devices. As mentioned, the mobile device can be a smartphone, mobile station, mobile phone, table pc, digital camera or the like or any other type of mobile electronic device.

The circuitry may be further configured to generate the mobile device position information based on an inertial navigation system calculation, as discussed above.

The circuitry may be further configured to decrypt data based on the received authentication data, as discussed above.

The circuitry may be further configured to grant access to the mobile device based on the received authentication data, as discussed above.

The circuitry may be further configured to automatically unlock the mobile device. As discussed above, the mobile device may be unlocked in response to detecting a proximity of the wearable device or additionally in response to receiving the authentication data.

Thereby, access to the mobile device is granted as long as the wearable device and the mobile device are in a predefined proximity to each other.

The methods as described herein are also implemented in some embodiments as a computer program causing a computer and/or a processor (circuitry) to perform the method, when being carried out on the computer and/or processor (circuitry). In some embodiments, also a non-transitory computer-readable recording medium is provided that stores therein a computer program product, which, when executed by a processor (circuitry), such as the processor (circuitry) described above, causes the methods described herein to be performed.

Figure 2:
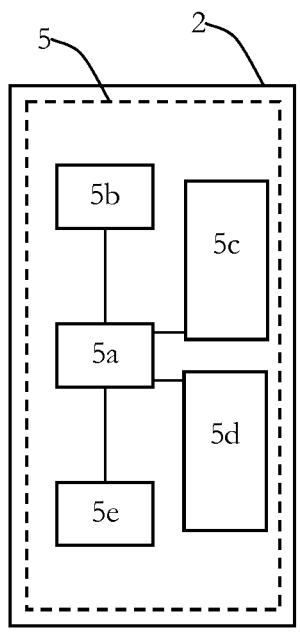
FIG. 2 schematically illustrates the wearable device of FIG. 1.
Figure 3:
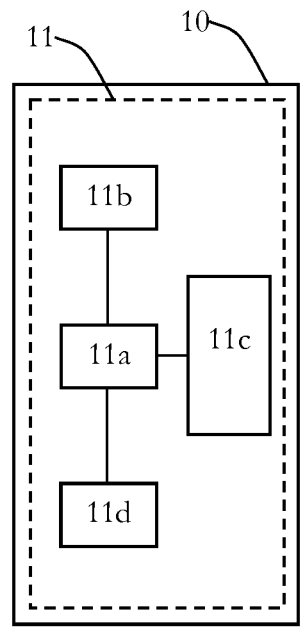
FIG. 3 schematically illustrates the mobile device of FIG. 1.

Returning to FIG. 1, there is an authentication system 1 illustrated, in which a crypto-wearable device 2 (see also FIG. 2) communicates wirelessly with a mobile device 10 (see also FIG. 3).

The crypto-wearable device 2 has a wristlet 3 which can be closed via two clasps 4a and 4b. The crypto-wearable device 2 has also a circuitry 5.

The circuitry 5 has a processor 5a which is connected to a detection means 5b, which detects whether the clasps 4a and 4b are closed or not. The detection means 5b includes a magnetic contact sensor which recognizes opening and closing of the clasps 4a and 4b. The circuitry 5 has also a wireless interface 5c and sensors 5d and a memory 5e. The sensors 5d are acceleration sensors and gyroscopic sensors. In some embodiments, a magnetometer is used instead of the acceleration sensors and the gyroscopic sensors or in addition to at least one of the acceleration sensors and the gyroscopic sensors.

The mobile device 10 is a smartphone, and has a circuitry 11, which has touchscreen 12 and an input button 13. The touchscreen 12 can be used as input means as it is generally known. The circuitry 11 has also a processor 11, a wireless interface 11b, sensors 11c and a memory 11d. The sensors 11c are acceleration sensors and gyroscopic sensors. In some embodiments, a magnetometer is used instead of the acceleration sensors and the gyroscopic sensors or in addition to at least one of the acceleration sensors and the gyroscopic sensors.

In the following, the functions of system 1, the crypto-wearable device 2 and the mobile device 10 are explained under reference of FIG. 4.

Figure 4:
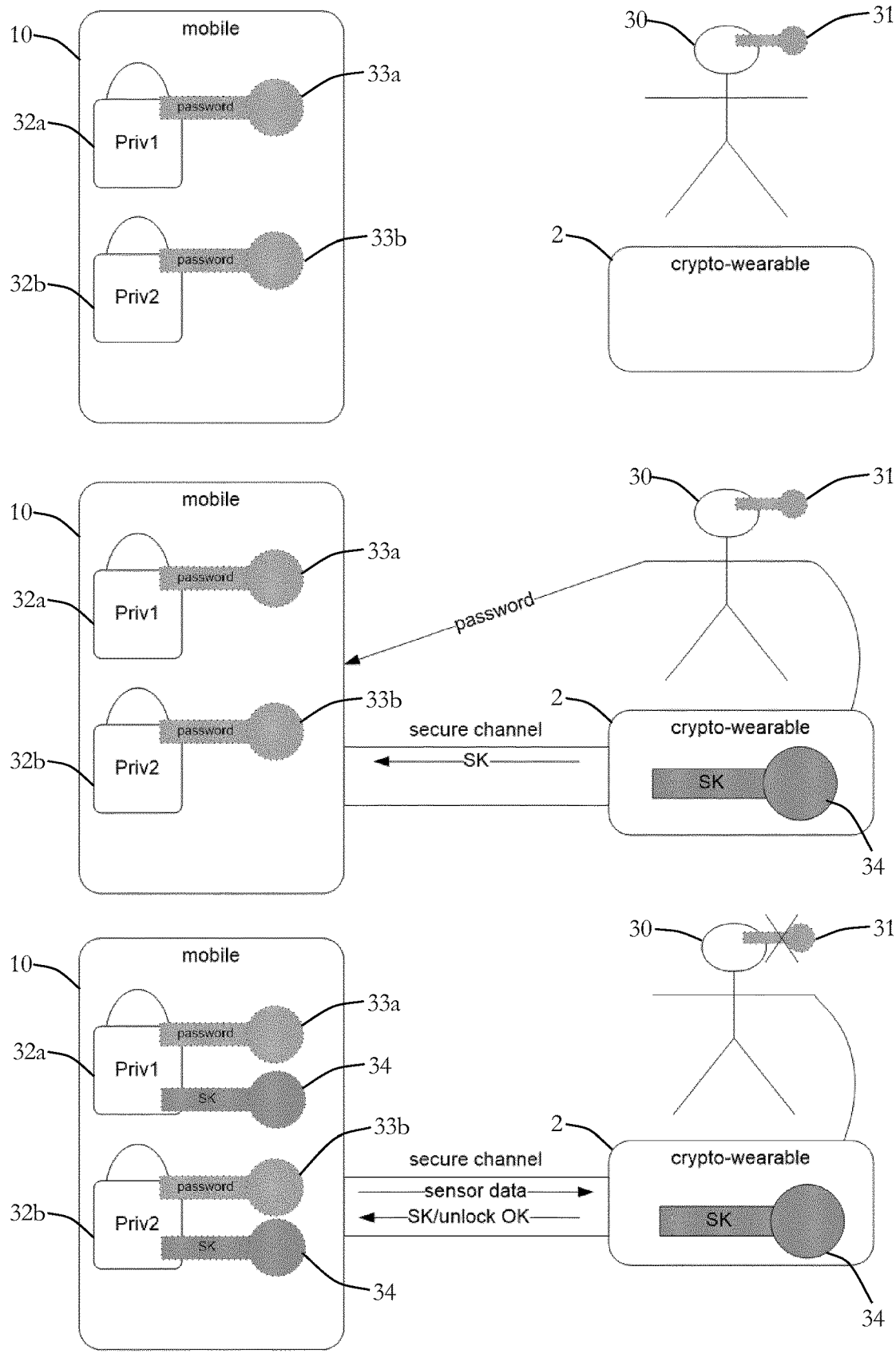
FIG. 4 illustrates pairing between the mobile device and the wearable device and it illustrates the proofs of automatic unlocking the mobile device.

In the uppermost part of FIG. 4, an initial setting is illustrated.

A user 30 knows a password 31, which is used, for example, to unlock the mobile device 10, which is password-protected.

The mobile device 10 has also stored, for example, private data 32a and 32b in its memory 11d. The private data 32a and 32b is each protected with a respective private key 33a and 33b, which itself is protected with the password 31, and which are also stored, for example, in the memory 11d. The private data 32a and 32b may also be services, apps, or the like which are password protected. The mobile device 10 may use FIDO (Fast Identity Online) to agree on a public/private key, e.g. keys 33a and 33b, to access respective FIDO-enabled services running on the mobile device 10.

For example, in the morning, the user 30 puts on the wearable device 2, closes the clasps 4a and 4b, thereby the circuitry 5 recognizes with the detection means 5b that the clasps 4a and 4b are closed.

The user 30 inputs the password 31 into mobile device 10 and thereby unlocks it.

Then, as also illustrated in the middle of FIG. 4, the wearable device 2 and the mobile device 10, which communicate via their wireless interfaces 5c and 11b via BLE (Bluetooth Low Energy), perform a pairing procedure during which a secure communication channel is established between the wearable device 2 and the mobile device 10. The pairing procedure may be performed in a secure environment, e.g. at home. Moreover, the mobile device 10 may verify the authenticity of the wearable device 2, e.g. based on the manufacturer key of the wearable device 2, before setting up the secure communication channel.

During the pairing procedure, the wearable device 2 and the mobile device 10 agree on/exchange a symmetrical key SK 34. As it is generally known to the skilled person, a symmetrical key can be used for encryption and decryption of data. The symmetrical key 34 may be temporary and/or random and is stored in the memory 5e of the wearable device 2. The symmetrical key may be considered as authentication data discussed herein.

The mobile device 10 may encrypt its private keys 33a and 33b, e.g. FIDO key, with the symmetrical key SK 23 and stores the encrypted keys in a RAM area of the memory 11d.

After pairing, which is illustrated in the lowest drawing of FIG. 14, the mobile device 10 has the private keys 33a and 33b protected by the password 31 and the symmetrical key SK 34.

The wearable device 2 sends the symmetrical key SK 34 if the mobile device 10 is close enough, i.e. if a proximity of the mobile device 10 is detected by the circuitry 5 of the wearable device 2.

As will also be discussed further below, the proximity is detected by comparing sensor data (representing position information) from the sensors 5d of the wearable device 2 and the sensors 11c of the mobile device 10. Upon receipt of the symmetrical key 34, the mobile device 10 will unlock and will decrypt the private keys 33a and 33b. Hence, the user 30 does not need to use his password anymore, and the mobile device 10 is just unlocked by the proximity of the wearable device 2, which sends the authentication data upon detection of proximity to the mobile device 10 via the secured communication channel.

Of course, in other embodiments, also the mobile device 10 may compare the sensor data and may communicate, for example, an indication that a proximity condition between the wearable device 2 and the mobile device 10 is met.

Hence, as long as the user 30 wears the wearable device 2, the mobile device 10 is automatically unlocked and the symmetric key 34 for decrypting the private keys 33a and 33b is received. However, should the circuitry 5 detect that the wearable device 2 is put off or taken off, e.g. based on the opening of clasps 4a and 4b, the mobile device 10 and the wearable device 2 are un-paired, and thus, the symmetrical key 34 is not sent anymore since the communication is correspondingly restricted.

Moreover, the memory 11e of the wearable device 2 may be wiped out upon detection that the clasps 4a and 4b are opened such that the symmetrical key 34 is not stored anymore such that the wearable device 2 cannot be used anymore for unlocking and getting access to the mobile device 10.

Both, the mobile device 10 and the crypto-wearable device 2, continuously update their position through inertial navigation system (INS) calculations (indoor micro-locations). Hence, each circuitry 5 and 11 collects sensor signals from sensors 5d and 11c, respectively, and thereby calculates positions of the device 2 and 10, respectively, based on accumulated sensor signals obtained from sensors 5d and 11c, whereby the mobile device and wearable device position information is obtained.

As both, the wearable device 2 and the mobile device 10, continuously update their position information, at each point in time the resulting position of both devices 2 and 10 can be compared for detecting proximity of the devices 2 and 10.

Figure 5:
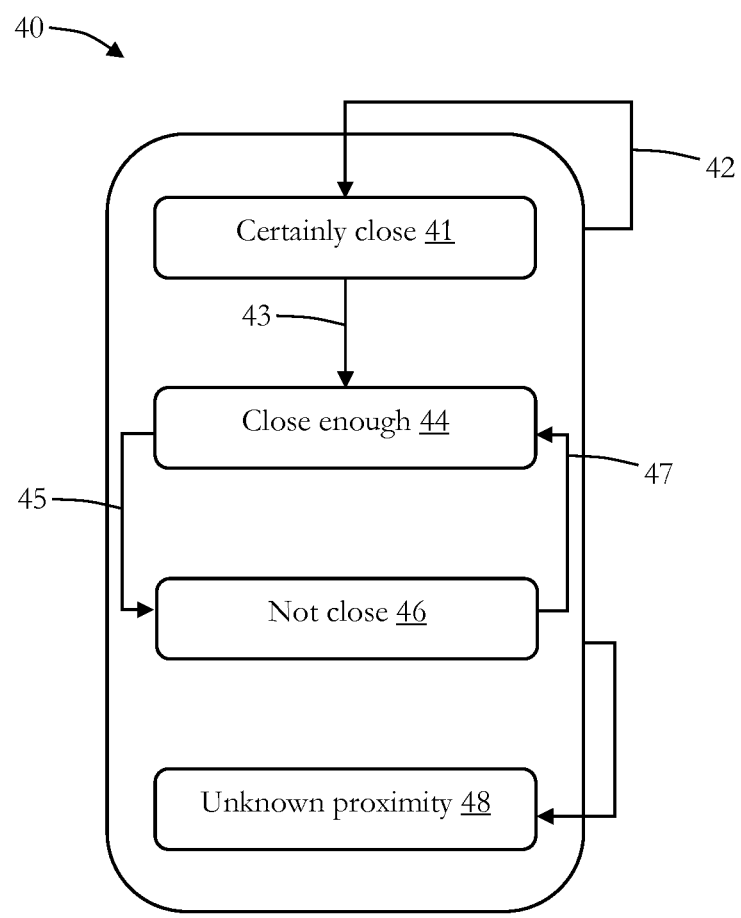
FIG. 5 illustrates a method of proximity detection.

FIG. 5 illustrates a flow chart 40 of detecting proximity between the wearable device 2 and the mobile device 10, which may be performed by the wearable device 2.

At 41, it is checked whether the mobile device 10 is certainly close. Here, the wearable device 2 compares the position information transmitted from the mobile device 10 with the position information of the wearable device 2. If the two positions match and/or if position amendments match, proximity is detected and it is detected that the mobile device 10 is close. For example, this is the case for movement patterns, since, for example, position information changes in the mobile device position information and the wearable device position information correspond to each other, since, for example, the user 30 has the mobile device 10 in the hand of the arm where also the wearable device 2 is located. Another example is that the user 30 has worn the mobile device 10 in a pocket for some time so that in the history or in the past the movement pattern and the positions corresponded to each other, such that proximity and the certainly close condition are detected. The loop 42 indicates that this comparison can be repeated.

If the distance between the mobile device 10 and the wearable device 2 increases, i.e. since either the mobile device 10 or the wearable device moves away at 43, the next check is made at 44 whether the mobile device 10 is close enough, hence, whether the proximity is below a predetermined threshold value.

If the distance increases further, which is indicated by arrow 45, it is checked at 46 whether the proximity is not detected since, for example, the distance exceeds the predetermined threshold and thus, a state where the mobile device 10 is not close enough and thus, no proximity is detected.

At 48, a state of unknown proximity is detected in cases where, for example, an error occurs, such as that the wireless communication connection is lost or disturbed, a position error is too large or unreasonable so that errors in the INS position calculation become too large or the like.

Figure 6:
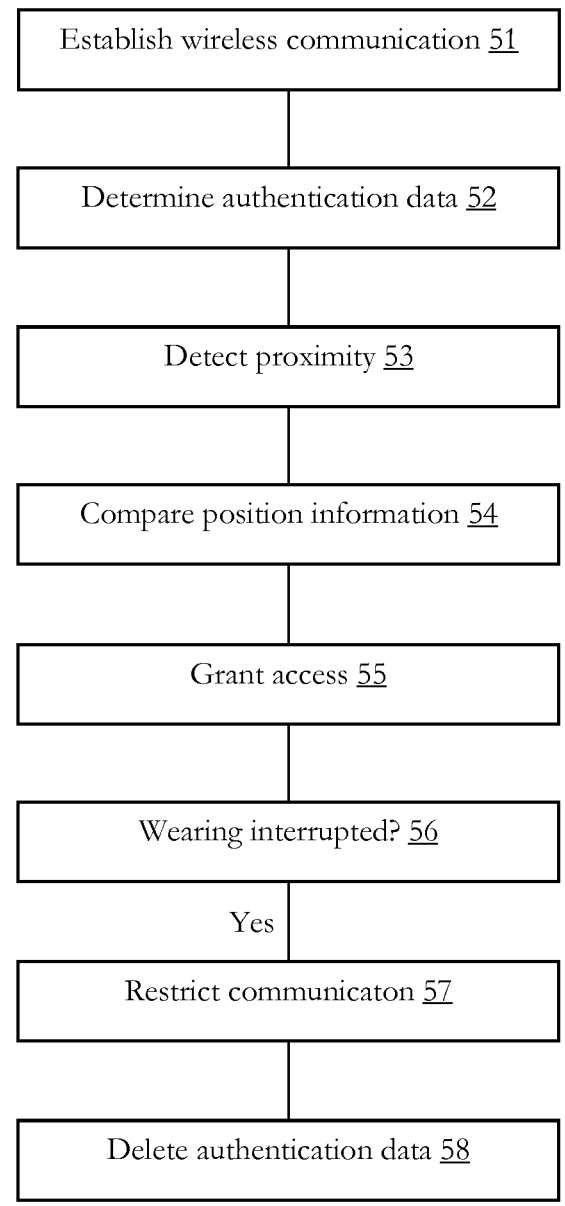
FIG. 6 is a flowchart of an authentication method.

In the following, an authentication method 50 is discussed under reference of FIG. 6, which may be performed by the system 1.

At 51, a wireless communication between a mobile device (e.g. 10) and a wearable device (e.g. 20) is established by pairing the devices (2, 10) as also discussed above.

At 52, authentication data (e.g. symmetrical key above) are determined, as discussed above.

At 53, proximity is detected between the mobile device and the wearable device by comparing at 54 mobile device position information and wearable device position information as discussed above, for example, also under reference of FIG. 4.

At 55, access is granted to the mobile device based on a detected proximity and the authentication data, as also discussed above.

As discussed above, the mobile device position information and the wearable device position information may be based on an inertial navigation system calculation, which, in turn, is based on acceleration information and gyroscope information.

As discussed above, the comparing of the mobile device position information and the wearable device position information includes determining a deviation between the mobile device position information and the wearable device position information, as discussed above. Proximity is not detected in the case that the deviation exceeds a predetermined threshold.

At 56, it is detected whether wearing of the wearable device by a user has been interrupted and if this is the case, the wireless communication between the mobile device and the wearable device is restricted in response to detecting that the wearing of the wearable device has been interrupted at 57 and authentication data stored in a storage of the wearable device are deleted in response to detecting that the wearing of the wearable device has been interrupted at 58, as also discussed above.

As discussed above, in some embodiments it is relied on the above-discussed proximity detection which is more secure than the Bluetooth Low energy proximity detection since the BLE is by itself not secure, prone to relay attack and supports too big a range.

As in some embodiments, data from sensors, e.g. accelerometer, gyroscopic sensor and the like, are used for checking proximity, security may be enhanced.

For example, a user holding the mobile device in a hand on an arm which also has the wearable device results in the same or very similar accelerometer signals and thus, the same or similar position information. A similar scenario pertains to a user who is walking while having the mobile device in a pocket, which also results in a match of the accelerometer readings of the mobile device and the wearable device.

By using indoor micro-location determination, e.g. using INS, which is performed by both, the mobile device and the wearable device, current position information is available which can be compared to each other and it can be checked whether a proximity can be detected.

Hence, if initially the wearable device and the mobile device are close to each other, as discussed above, new positions of the wearable device and the mobile device are calculated using INS and as long as the calculated positions do not differ too much from each other (e.g. do not exceed a predetermined threshold), the wearable device is considered to be close enough for authentication, as discussed above.

Once the wearable device and the mobile device are considered to be out of reach, i.e. no proximity is detected, and, for example, the errors on position calculation become too large, in some embodiments micro-locations are not used, anyone and any of the aforementioned methods may be used for resyncing the wearable device and the mobile device.

As also indicated above, also data from environmental sensors for at least one of the wearable device and the mobile device may be used for detecting or checking proximity. Such environmental sensors may be temperature sensors, sound sensors, light sensors, humidity sensors and the like.

In some embodiments, proximity detection may also be triggered by a gesture with the wearable device.

In some embodiments, the above-discussed methods can be integrated as software component in an existing wearable device.

In some embodiments, the wearable device may be made as thin-film, as a patch or the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An authentication method, comprising:
  establishing a wireless communication between a mobile device and a wearable device;
  detecting a proximity between the mobile device and the wearable device by comparing mobile device position information and wearable device position information; and
  granting access to the mobile device based on a detected proximity.

(2) The authentication method of (1), wherein at least one of the mobile device position information and the wearable device position information is based on an inertial navigation system calculation.

(3) The authentication method of (1) or (2), wherein at least one of the mobile device position information and the wearable device position information is based on at least one of acceleration information, gyroscope information and magnetometer information.

(4) The authentication method of anyone of (1) to (3), wherein comparing the mobile device position information and the wearable device position information comprises determining a deviation between the mobile device position information and the wearable device position information.

(5) The authentication method of (4), wherein proximity is not detected in case that the deviation exceeds a predetermined threshold.

(6) The authentication method of anyone of (1) to (5), further comprising determining authentication data.

(7) The authentication method of (6), wherein granting access to the mobile device is further based on the authentication data.

(8) The authentication method of anyone of (1) to (7), wherein establishing the wireless communication between the mobile device and the wearable device comprises pairing the mobile device and the wearable device.

(9) The authentication method of anyone of (1) to (8), further comprising detecting whether wearing of the wearable device by a user has been interrupted.

(10) The authentication method of (9), wherein the wireless communication between the mobile device and the wearable device is restricted in response to detecting that the wearing of the wearable device has been interrupted.

(11) The authentication method of (9) or (10), wherein authentication data stored in a storage of the wearable device are deleted in response to detecting that the wearing of the wearable device has been interrupted.

(12) A wearable device for granting access to a mobile device comprising circuitry configured to: establish a wireless communication with the mobile device; and send authentication data to the mobile device in response to a detected proximity between the mobile device and the wearable device, wherein the proximity is detected based on a comparison of mobile device position information and wearable device position information.

(13) The wearable device of (12), wherein the circuitry is further configured to generate the wearable device position information based on an inertial navigation system calculation.

(14) The wearable device of (12) or (13), wherein the circuitry is further configured to detect whether wearing of the wearable device by a user has been interrupted.

(15) The wearable device of anyone of (12) to (14), wherein the circuitry is further configured to store the authentication data and to delete the authentication data in response to detecting that the wearing of the wearable device has been interrupted.

(16) A mobile device comprising circuitry configured to:
establish a wireless communication with a wearable device;
receive authentication data to the mobile device in response to a detected proximity between the mobile device and the wearable device, wherein the proximity is detected based on a comparison of mobile device position information and wearable device position information; and
grant access to the mobile device based on a detected proximity.

(17) The mobile device of (16), wherein the circuitry is further configured to generate the mobile device position information based on an inertial navigation system calculation.

(18) The mobile device of (16) or (17), wherein the circuitry is further configured to decrypt data based on the received authentication data.

(19) The mobile device of anyone of (16) to (18), wherein the circuitry is further configured to grant access to the mobile device based on the received authentication data.

(20) The mobile device of anyone of (16) to (19), wherein the circuitry is further configured to automatically unlock the mobile device.

(21) A computer program comprising program code causing a computer to perform the method according to anyone of (1) to (11) when being carried out on a computer.

(22) A non-transitory computer-readable recording medium that stores therein a computer program product, which, when executed by a processor, causes the method according to anyone of (1) to (11) to be performed.

The invention claimed is:

1. An authentication method carried out by a wearable device and a mobile device, comprising:
establishing a wireless communication between the mobile device and the wearable device during a pairing procedure;
agreeing, by the mobile device and the wearable device, on authentication data during the pairing procedure, the authentication data including a symmetric key;
encrypting, by the mobile device, private data using private keys during the pairing procedure;
after the pairing procedure, detecting, by the wearable device, a proximity between the mobile device and the wearable device by comparing mobile device position information and wearable device position information determined independently from each other, at least one of the mobile device position information and the wearable device position information being based on an inertial navigation system calculation, wherein the mobile device position information includes mobile device historical position information and the wearable device position information includes wearable device historical position information, and wherein each of the mobile device position information and the wearable device position information is indicative of an indirect and non-absolute indication of relative position of the mobile device or the wearable device relative to a certain start position and start time;
determining, from the mobile device position information, a first movement pattern of the mobile device, and determining, from the wearable device position information, a second movement pattern of the wearable device,
sending, by the wearable device, the symmetric key to the mobile device based on the detected proximity responsive to the first movement pattern of the mobile device being determined to match the second movement pattern of the wearable device;
granting, by the mobile device, the wearable device access to the mobile device based on authentication of the symmetric key; and
decrypting, by the mobile device, the encrypted private keys using the symmetric key based on the authentication of the symmetric key in order to decrypt the encrypted private data.

2. The authentication method of claim 1, wherein at least one of the mobile device position information and the wearable device position information is based on at least one of acceleration information, gyroscope information, and magnetometer information.

3. The authentication method of claim 1, wherein said comparing the mobile device position information and the wearable device position information includes determining a deviation between the mobile device position information and the wearable device position information.

4. The authentication method of claim 3, wherein the proximity is not detected in a case where the deviation exceeds a predetermined threshold.

5. The authentication method of claim 1, further comprising detecting whether wearing of the wearable device by a user has been interrupted.

6. The authentication method of claim 5, wherein the wireless communication between the mobile device and the wearable device is restricted in response to said detecting that the wearing of the wearable device has been interrupted.

7. The authentication method of claim 5, wherein the authentication data is stored in a storage of the wearable device and are deleted in response to detecting that the wearing of the wearable device has been interrupted.

8. A non-transitory computer-readable storage medium having stored thereon instructions that, when executed by one or more processors, causes the one or more processors to perform a method comprising:
  establishing a wireless communication between a mobile device and a wearable device during a pairing procedure;
  agreeing, by the mobile device and the wearable device, on authentication data during the pairing procedure, the authentication data including a symmetric key;
  encrypting, using the mobile device, private data using private keys during the pairing procedure;
  after the pairing procedure, detecting, using the wearable device, a proximity between the mobile device and the wearable device by comparing mobile device position information and wearable device position information, at least one of the mobile device position information and the wearable device position information being based on an inertial navigation system calculation;
  determining, from the mobile device position information, a first movement pattern of the mobile device, and determining, from the wearable device position information, a second movement pattern of the wearable device;
  sending, using the wearable device, the symmetric key to the mobile device based on the detected proximity responsive to the first movement pattern of the mobile device being determined to match the second movement pattern of the wearable device;
  granting, using the mobile device, the wearable device access to the mobile device based on authentication of the symmetric key;
  decrypting, using the mobile device, the encrypted private keys using the symmetric key based on the authentication of the symmetric key in order to decrypt the encrypted private data; and
  after said granting, determining whether the proximity between the wearable device and the mobile device is increasing in distance, and, in a case where the proximity is determined to be increasing in distance, determining whether the proximity is still within a predetermined threshold to maintain the wearable device access to the mobile device based on the authentication of the symmetric key,
  wherein the predetermined threshold is defined based on a typical distance between the wearable device when the wearable device is on a wrist of a user and the mobile device is in a hand of the user.

9. The non-transitory computer-readable storage medium according to claim 8, wherein at least one of the mobile device position information and the wearable device position information is based on at least one of acceleration information, gyroscope information, and magnetometer information.

10. The non-transitory computer-readable storage medium according to claim 8, wherein said comparing the mobile device position information and the wearable device position information includes determining a deviation between the mobile device position information and the wearable device position information.

11. The non-transitory computer-readable storage medium according to claim 10, wherein the proximity is not detected in a case where the deviation exceeds the predetermined threshold.

12. The non-transitory computer-readable storage medium according to claim 8, wherein the method further comprises detecting whether wearing of the wearable device by the user has been interrupted.

13. The non-transitory computer-readable storage medium according to claim 12, wherein the wireless communication between the mobile device and the wearable device is restricted in response to said detecting that the wearing of the wearable device has been interrupted.

14. The non-transitory computer-readable storage medium according to claim 12, wherein the method further comprises deleting the authentication data stored in a storage of the wearable device in response to detecting that the wearing of the wearable device has been interrupted.

15. A system comprised of a wearable device and a mobile device different from the wearable device comprising:
  circuitry configured to
    establish a wireless communication between the mobile device and the wearable device during a pairing procedure,
    agree on authentication data during the pairing procedure between the mobile device and the wearable device, the authentication data being a symmetric key,
    encrypt private data using one or more private keys during the pairing procedure,
    after the pairing procedure, detect a proximity between the mobile device and the wearable device by comparing mobile device position information and wearable device position information determined independently from each other, at least one of the mobile device position information and the wearable device position information being based on an inertial navigation system calculation, wherein the mobile device position information includes mobile device historical position information and the wearable device position information includes wearable device historical position information, and wherein each of the mobile device position information and the wearable device position information is indicative of an indirect and non-absolute indication of relative position of the mobile device or the wearable device relative to a certain start position and start time,
    determine, from the mobile device position information, a first movement pattern of the mobile device, and determining, from the wearable device position information, a second movement pattern of the wearable device,
    responsive to the first movement pattern of the mobile device matching the second movement pattern of the wearable device, send the symmetric key to the mobile device based on the detected proximity,
    grant the wearable device access to the mobile device based on authentication of the symmetric key, decrypt the encrypted one or more private keys using the symmetric key based on the authentication of the symmetric key in order to decrypt the encrypted private data, and after said granting, determine whether the proximity between the wearable device and the mobile device is increasing, and, in a case where the proximity is determined to be increasing, determine whether the proximity is still within a predetermined threshold to maintain the wearable device access to the mobile device based on the authentication of the symmetric key.

16. The system according to claim 15, wherein at least one of the mobile device position information and the wearable device position information is based on at least one of acceleration information, gyroscope information, and magnetometer information.

17. The system according to claim 15, wherein the comparing the mobile device position information and the wearable device position information includes determining a deviation between the mobile device position information and the wearable device position information, and wherein the proximity is not detected in a case where the deviation exceeds a predetermined threshold.

18. The system according to claim 15, wherein the circuitry is configured to detect whether wearing of the wearable device by a user has been interrupted, and delete the authentication data stored in a storage of the wearable device in response to detecting that the wearing of the wearable device has been interrupted.

* * * * *